(12) United States Patent
Takahashi et al.

(10) Patent No.: US 6,952,229 B1
(45) Date of Patent: Oct. 4, 2005

(54) DIGITAL CAMERA HAVING INPUT DEVICES AND A DISPLAY CAPABLE OF DISPLAYING A PLURALITY OF SET INFORMATION ITEMS

(75) Inventors: Yukio Takahashi, Nagano (JP); Keisuke Okuma, Aichi (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/549,167

(22) Filed: Apr. 13, 2000

(30) Foreign Application Priority Data

| Apr. 13, 1999 | (JP) | ............................................ 11-105124 |
| Apr. 13, 1999 | (JP) | ............................................ 11-105277 |
| Apr. 13, 1999 | (JP) | ............................................ 11-105285 |
| Mar. 29, 2000 | (JP) | ....................................... 2000-090663 |

(51) Int. Cl.⁷ ............................................... H04N 5/222
(52) U.S. Cl. ................................................ 348/333.02
(58) Field of Search ........................ 348/333.05, 333.12, 348/333.01, 333.02, 207.99, 14.03; 345/784, 786, 825, 826, 828, 830, 834; 455/566

(56) References Cited

U.S. PATENT DOCUMENTS

| 4,134,537 | A |   | 1/1979  | Glaser et al.                  |
| 4,856,081 | A | * | 8/1989  | Smith ........................ 455/151.4 |
| 6,154,210 | A | * | 11/2000 | Anderson ..................... 345/840 |
| 6,233,015 | B1 | * | 5/2001  | Miller et al. ........... 348/333.05 |
| 6,249,316 | B1 | * | 6/2001  | Anderson .............. 348/333.05 |
| 6,310,648 | B1 | * | 10/2001 | Miller et al. ........... 348/333.05 |
| 6,486,914 | B1 | * | 11/2002 | Anderson .............. 348/333.02 |
| 6,519,003 | B1 | * | 2/2003  | Swayze ....................... 348/375 |
| 6,608,650 | B1 | * | 8/2003  | Torres et al. ........... 348/333.02 |
| 6,680,749 | B1 | * | 1/2004  | Anderson et al. ...... 348/231.99 |

FOREIGN PATENT DOCUMENTS

| JP | 54-547     | 5/1979  |
| JP | 5-91387    | 4/1993  |
| JP | 5-207343   | 8/1993  |
| JP | 6-138993   | 5/1994  |
| JP | 7-281274   | 10/1995 |
| JP | 9-233375   | 9/1997  |
| JP | 9-281582   | 10/1997 |
| JP | 10-32735   | 2/1998  |
| JP | 10-197933  | 7/1998  |
| JP | 10-285516  | 10/1998 |
| JP | 10-301188  | 11/1998 |
| JP | 10-327335  | 12/1998 |
| JP | 11-88815   | 3/1999  |

OTHER PUBLICATIONS

Kodak Digital Science DC210 Plus Zoom/DC200 Cameras User's Guide □□Eastman Kodak Company, 1998.*

* cited by examiner

*Primary Examiner*—Wendy R. Garber
*Assistant Examiner*—Timothy J. Henn
(74) *Attorney, Agent, or Firm*—Sughrue Mion, PLLC (57) ABSTRACT

An LCD (21) for displaying a plurality of set information items is provided for a digital camera (10). When a plurality of input keys disposed around the LCD (21) are depressed, set information which is displayed adjacent to the input key can be changed. A control portion of the digital camera (10) performs a variety of control operations of the digital camera (10) in accordance with set information. Therefore, the position of the input portion which is used when the setting of the digital camera (10) can easily be understood. Thus, the setting can be changed by performing only a simple operation.

7 Claims, 10 Drawing Sheets

DIGITAL CAMERA HAVING INPUT DEVICES AND A DISPLAY CAPABLE OF DISPLAYING A PLURALITY OF SET INFORMATION ITEMS

BACKGROUND OF THE INVENTION

1. Field of the Invention

The present invention relates to a digital camera which converts light from an object to be photographed, into digital data, and stores the digital data.

The present application is based on Japanese Patent Application Nos. Hei. 11-105277, Hei. 11-105285, Hei. 11-105124, and 2000-90663, which are incorporated herein by reference.

2. Description of the Related Art

There is known a digital camera which converts light into an electric signal by an optical sensor, such as a CCD or the like and further converts the electric signal into digital data so as to be stored in a storage medium, such as a flash memory or the like. The digital camera permits saving of image data and a variety of processes to easily and personally be performed by using a personal computer or the like. Moreover, a photograph can be printed by outputting image data to a printer without a necessity for performing development of a film. Since the print quality of the printer has been improved, a photograph having excellent quality which cannot substantially be distinguished from a film photograph can be printed.

It is preferable that the digital camera has a multiplicity of functions to permit a user to set a multiplicity of required items. To enable the user to quickly change the setting, a multiplicity of input device, such as buttons etc., must be provided. In the foregoing case, assignment of the functions to the buttons cannot easily be understood by the user. Since the size of each button is undesirably reduced, there arises a problem in that the button cannot easily be depressed.

It might be feasible to employ a structure for reducing the number of buttons such that a menu screen is displayed on a display unit, such as a liquid crystal display (LCD) unit, to permit a process which must be executed to be selected in accordance with combination of the selected button and a decision button. In the foregoing case, there arises another problem in that the required operation becomes too complicated and an excessively long time is required.

When the menu screen is displayed on the display portion to select a process which must be executed in accordance with the combination of the selected button and the decision button, there is apprehension that the finger of the user undesirably covers the display portion when the button is operated. Therefore, the operation for causing the finger to approach the display portion and move away from the display must be repeated. Thus, there arises a problem in that the operability deteriorates.

SUMMARY OF THE INVENTION

To solve the foregoing problems, an object of the present invention is to provide a digital camera which is capable of changing a variety of settings by a simple operation.

Another object of the present invention is to provide a digital camera with which the operability of input devices can be improved.

According to the first, tenth or seventeenth aspect of the present invention, there is provided a digital camera which comprises a plurality of input devices respectively disposed adjacent to a plurality of set information items displayed on a display portion. Therefore, the input devices can be operated while the set information items displayed on the display portion are being observed. Accordingly, it follows that the location of the input portion which is used when the setting of the digital camera is changed can easily be detected, and therefore, the setting can be changed by performing a simple operation.

According to the second, eighth, or fifteenth aspect of the present invention, the input devices may include a plurality of first input devices disposed along a periphery of the display portion in a direction which is in parallel with an axial line of the shutter button, and a plurality of second input devices disposed in a direction perpendicular to the direction of the first input devices. The first input devices and the second input devices are disposed perpendicular to each other. Accordingly, there is no apprehension that the fingers of the user intersect in the vicinity of the display portion when the digital camera is operated and that the operation of either finger obstructs the operation of another finger. Hence, it follows that the operability of the input devices can be improved.

According to the third, ninth, or sixteenth aspect of the present invention, the first input devices may be disposed along a first side surface of the display portion adjacent to the shutter button, and the second input devices may be disposed along a second side surface of the display portion opposite to a third side surface of the display portion adjacent to the shutter button, across the display portion. In general, a user operates the shutter button with the forefinger. Therefore, when, for example, the shutter button is operated with the right hand, an operation is permitted such that the thumb of the right hand operates the first input devices and the thumb of the left hand operates the second input devices. That is, an operation of the input devices is permitted such that the thumbs of the right and left hands are used to operate the input devices in a state where the middle, third and little fingers of the right and left hands are holding the digital camera. At this time, the thumbs of the right and left hands do not obstruct the upper surface of the display portion. Moreover, the thumbs do not intersect each other and obstruct the operation. Accordingly, the input devices can be operated while the display portion is being observed. Moreover, the operability of the input devices can be improved.

According to the fourth, eleventh, or eighteenth aspect of the present invention, the plurality of set information items may include at least one kind of set information of shutter speed, aperture, white balance, and flash. Accordingly, the photographing conditions can quickly be changed by performing a simple operation.

According to the fifth or twelfth aspect of the present invention, a plurality of contents of the set information items may be circularly changed whenever input to the input devices is performed. Accordingly, one setting item can be changed without using a plurality of the input devices, and therefore, the operation can easily be performed. Incidentally, it is preferable that the number of the contents of set information which is circularly changed is four or less.

According to the sixth, thirteenth, or nineteenth aspect of the present invention, the display portion is capable of displaying an image in accordance with the image data. Therefore, the display can be used as a finder when the photograph operation is performed and the photographed image can be confirmed on the spot.

According to the seventh aspect of the present invention, there is provided a digital camera which comprises an image pickup portion which converts light from an object to be photographed, into image data, a display portion capable of displaying at least one of setting screens including a plurality of set information items, a displaying device which displays one type of a plurality of types of the setting screens on the display portion, a plurality of input devices, and a changing device which changes at least one of the set information items in accordance with input to at least one of the input devices. Accordingly, when one set information is changed, simple input to one input device is required, and therefore, the operation can easily be performed. Since the role of the input devices is changed in accordance with the setting screen of the plural types of setting screens, a multiplicity of settings can be changed in spite of a small number of input devices.

According to the fourteenth aspect of the present invention, there is provided a digital camera in which a plurality of alternatives are circularly displayed whenever input to the input devices is performed when the number of the alternatives of the set information items is not larger than a predetermined number. Accordingly, use of a plurality of the input devices is not required when one setting is changed, and therefore, the operation can easily be performed. It is preferable that the number of the alternatives which are circularly displayed is four or less. When the number of the alternatives of set information is larger than a predetermined number, another selection screen is displayed on the display portion. Therefore, increase in the number of input operations causing the operation to be made complicated can be prevented.

According to the twentieth aspect of the present invention, the selection screen displayed owing to input to the input devices displays all of the alternatives of the set information items. Therefore, permitted alternatives can easily be understood by a user.

DETAILED DESCRIPTION OF THE PREFERRED EMBODIMENT

An embodiment of the present invention will now be described with reference to the drawings.

Figure 3:
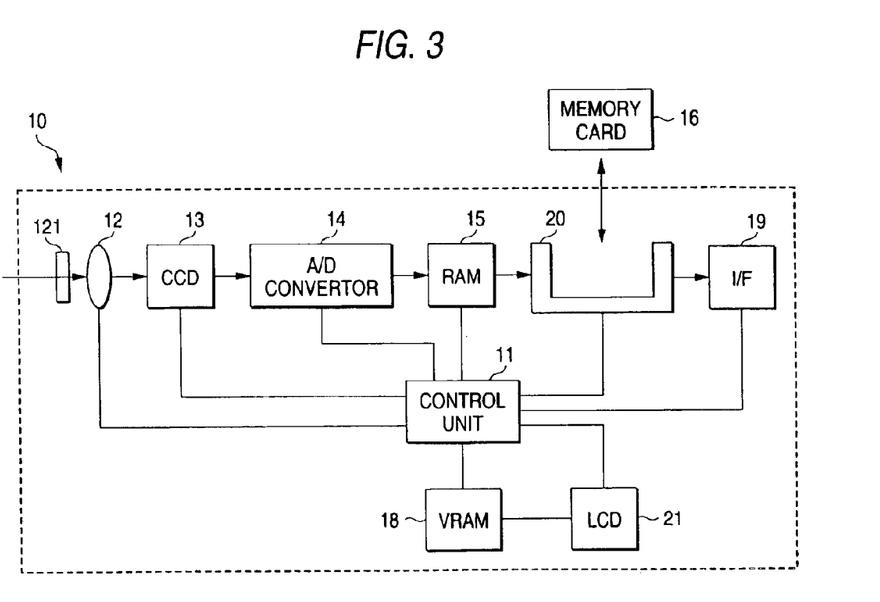
FIG. 3 is a block diagram showing the digital camera according to the embodiment of the present invention.

FIG. 3 is a block diagram showing the structure of a digital camera 10 according to the embodiment of the present invention. The digital camera 10 includes a control portion 11, a converging lens 12, a CCD (Charge Coupled Device) 13 serving as an image pickup portion, an A/D converter 14, a RAM (Random Access Memory) 15 in which image data is temporarily recorded, a memory card 16 in which compressed image data can be recorded, a card slot 20 into which the memory card 16 can be inserted and from which the same can be removed, a liquid crystal display unit (LCD) 21 for displaying an image, a VRAM 18 in which data for the image which is displayed on the LCD 21 is stored and an interface 19 for outputting data in the memory card 16 to an external unit.

The control portion 11 includes a CPU and a device for inputting/outputting data to execute a control program to perform a variety of control operations of the digital camera 10. The converging lens 12 is provided with a diaphragm 121 for adjusting the quantity of light which is input to the converging lens 12. When the CCD 13 is a CCD 13 having a structure that a plurality of image pickup devices having complementary-color filters C (Cyan), M (Magenta), Y (Yellow) and G (Green) are disposed in a matrix configuration, a color image can be photographed. The complementary-color filters may be C, M and Y filters. A CCD including primary color filters in R (Red), G (Green) and B (Blue) is sometimes employed. The RAM 15 is an S-DRAM (Synchronous Dynamic RAM) having a self-refreshing function.

The memory card 16 includes a flash memory or the like which is a reloadable storage medium capable of storing the recorded contents without a necessity of power supply and on which image data is recorded. The memory card 16 is removably inserted into the card slot 20 of the digital camera 10. When the memory card 16 is a memory card which is in conformity with PCMCIA standard or a memory card which can be adapted to a PCMCIA card adapter is employed, the contents of the memory card 16 can directly be read/written by a personal computer having a PCMCIA card slot.

Figure 1:
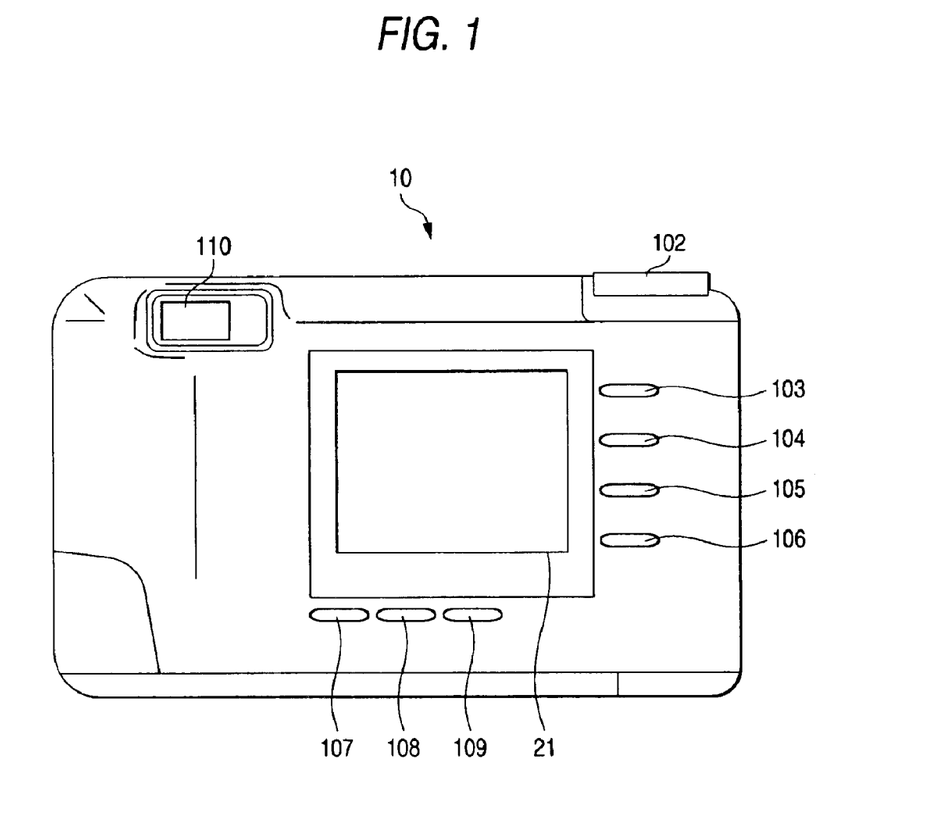
FIG. 1 is a rear view showing a digital camera according to an embodiment of the present invention.
Figure 2:
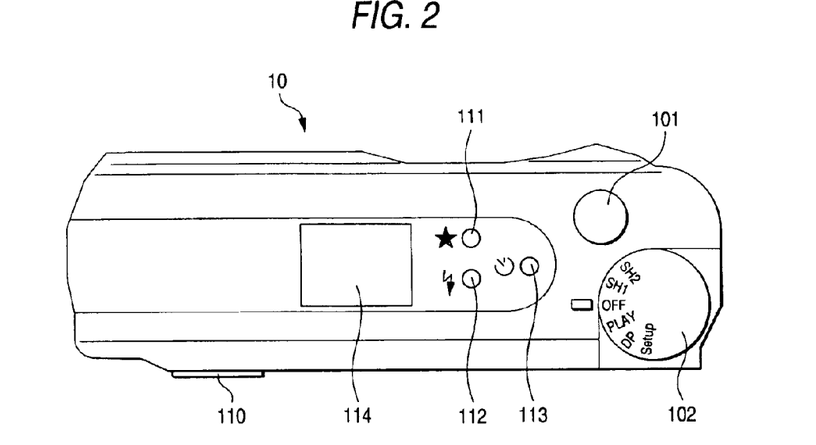
FIG. 2 is a top view showing the digital camera according to the embodiment of the present invention.

FIGS. 1 and 2 are a rear view and a plan view showing the digital camera 10 according to this embodiment. The digital camera 10 is operated such that a user uses the LCD 21 or an optical finder 110 serving as a view finder to determine a range which must be photographed. When the user has depressed a shutter button 101, a photographing operation is started. The control portion 11 is able to distinguish and recognize a state of "half depression" in which the shutter button 101 has been depressed half and a state of "full depression" in which the shutter button 101 has been depressed to the limit of movement or adjacent to the limit. The user operates a mode-switching dial 102 for switching the operation mode of the digital camera to select a mode from six modes which include a "view finder mode" which is a first photographing mode, an "LCD model" which is a second photographing mode, "Off", a "playback mode", a "direct print mode" and a "setup mode".

The "view finder mode" is a mode in which a photographing operation is performed by mainly using the optical finder 110 to save power consumption of the digital camera 10. The "LCD mode" is a mode in which a photographing operation is performed by mainly using the LCD 21 as the finder. The "playback model" is a mode in which an image in accordance with image data recorded on the memory card 16 is displayed. The "direct print mode" is a mode in which the digital camera 10 is connected to an external printer through the interface 19 to print the image. The "setup mode" is a mode in which a variety of settings of the digital camera 10 including the photographing condition are set. When the mode-switching dial 102 has been set to the position of "Off", the power source of the digital camera 10 is turned off.

Input keys 103 to 109 serving as input devices are disposed around the LCD 21. The digital camera 10 executes a control program corresponding to the selected mode. Then, the digital camera 10 detects input of the shutter button 101 and the input keys 103 to 109 performed by the user to perform corresponding control. An image-quality selection button 111, a flash selection button 112 and a mode selection button 113 are disposed in the upper portion of the digital camera 10. When the image-quality selection button 111 has been depressed, the compression ratio and the number of pixels of image data are changed. Thus, the image quality of the recorded image is changed. When the flash selection button 112 is depressed, the light emission mode of the flash can be selected from "automatic light emission control", "always light emission" and "always inhibition of light emission". When the mode selection button 113 has been depressed, switching is permitted among a "usual photographing mode", a "proximate photographing mode", an "enlargement photographing model" and a "panorama photographing mode". The contents set by each of the selection buttons 111, 112 and 113 are displayed on the segment-type LCD 114.

The input devices include first input devices having input keys 103, 104, 105 and 106 disposed in parallel with the axial line of the shutter button 101; and input keys 107, 108 and 109 disposed in a direction perpendicular to the direction in which the first input devices are disposed.

The first input devices are disposed in the side portion along the LCD 21 adjacent to the mode-switching dial 102. The input keys 103, 104, 105 and 106 serving as the first input devices are disposed below the mode-switching dial 102 shown in FIG. 1. On the other hand, the second input devices are disposed along the LCD 21 at an end opposite to the shutter button across the LCD 21. The input keys 107, 108 and 109 serving as the second input devices are disposed along the lower end of the LCD 21 shown in FIG. 1.

The first input devices are disposed along the short side of the rectangular LCD 21, while the second input devices are disposed along the longer side of the LCD 21. The first input devices are operated by the hand with which the mode-switching dial 102 is depressed, while the second input devices are operated by the other hand. Therefore, the hands for operating the first and second input devices do not intersect at a position above the LCD 21. Moreover, one of the hands does not obstruct the movement of the other hand.

The operation of the digital camera 10 according to this embodiment will now be described.

When the mode-switching dial 102 has been moved to the position of "Setup", the digital camera 10 is put into the setup mode. Thus, a plurality of set information items concerning the digital camera 10 as shown in FIG. 4(A) are displayed on the LCD 21.

Figure 4:
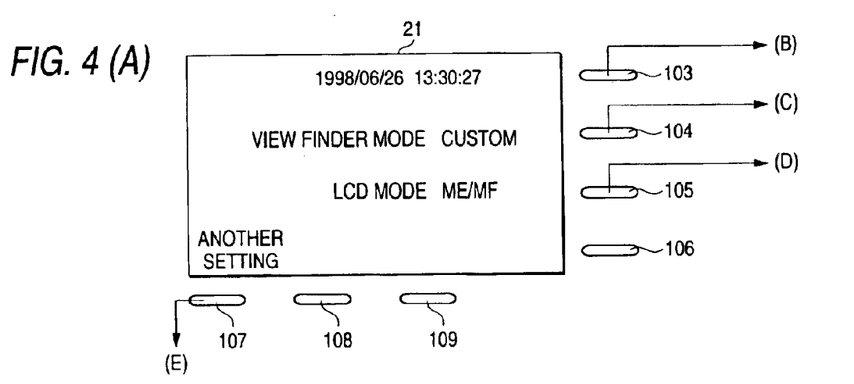
FIGS. 4(A) to 4(C) are diagrams showing input ! keys of the digital camera according to the embodiment of the present invention and a screen displayed on the LCD in a setup mode.

When the input key 103 disposed adjacent to a position on the LCD 21 at which the time and date are displayed has been depressed, the display on the LCD 21 is changed to that as shown in FIG. 4(B). Thus, the time and date can be adjusted. The input keys 108 and 109 are used to select the items which must be modified and the input keys 104 and 105 are used to change the numerical values. When the input key 103 or the input key 107 is depressed, the display is returned to the screen shown in FIG. 4(A).

When the input key 104 provided for a position adjacent to the position at which setting about the view finder mode is displayed has been depressed in a state in which the screen shown in FIG. 4(A) is displayed, a screen shown in FIG. 4(C) is realized. Thus, the setting of the view finder mode is changed from "custom" to "automatic". When the input key 104 has been again depressed, the screen shown in FIG. 4(A) is realized. Thus, the setting of the view finder mode is changed from the "automatic" to the "custom". That is, whenever the input key 104 is depressed, the setting of the view finder mode is alternately changed between the "custom" and the "automatic".

Figure 5:
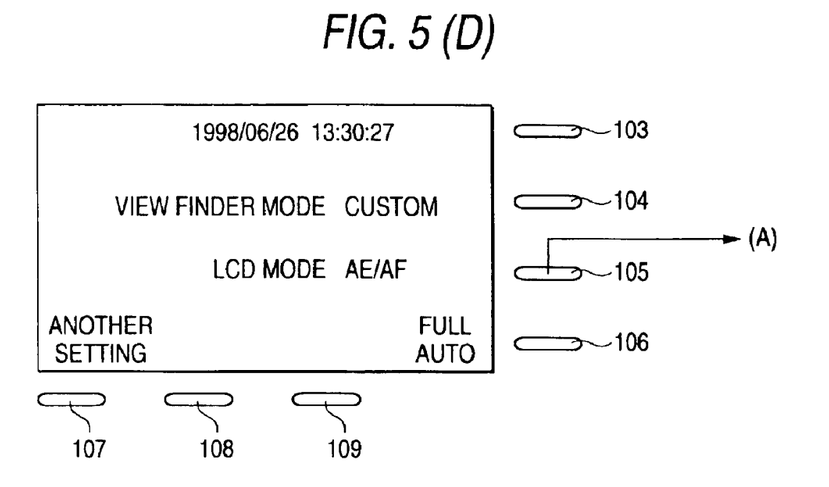
FIGS. 5(D) and 5(E) are diagrams showing the input keys of the digital camera according to the embodiment of the present invention and a screen displayed on the LCD in the setup mode.

Also in a case where the input key 105 disposed adjacent to a position at which the setting about the LCD mode is displayed has been depressed in a state where the screen shown in FIG. 4(A) is displayed, the setting of the LCD mode is alternately changed between "ME/MF" shown in FIG. 4(A) and "AE/AF" shown in FIG. 5(D) whenever the input key 105 is depressed. The "ME/MF" mode is a mode in which the user manually sets the exposure and/or the focal point, while the "AE/AF" mode is a mode in which the control portion 11 automatically sets the exposure and/or the focal point.

When the input key 107 disposed adjacent to a position at which characters "another setting" is depressed in a state where the screen shown in FIG. 4(A) is displayed, a screen shown in FIG. 5(E) is displayed. Thus, another setting information item is displayed. With the foregoing screen, the input key 103 is depressed to select setting of energy saving or no setting of the same. The input keys 104 and 105 are depressed to correct the exposure. When the input key 106 has been depressed, the language of the characters which are displayed on the LCD is selected. When the input key 108 has been depressed, whether or not sound recording is performed is selected. When the input key 109 has been depressed, whether or not shutter sound created by electronic synthesis is generated is selected when the shutter button 101 is depressed. When the input key 107 has been depressed, the setting screen shown in FIG. 4(A) is restored.

Figure 6:
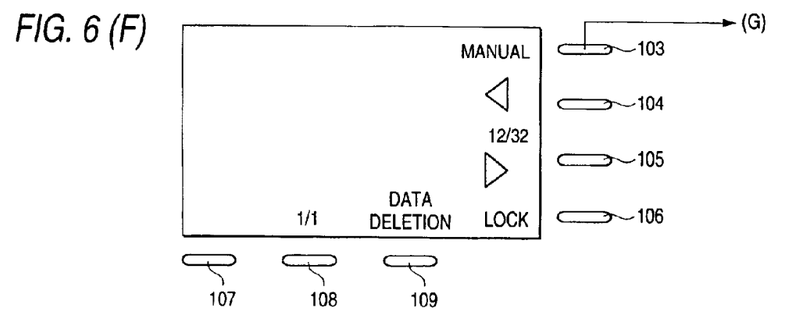
FIGS. 6(F) to 6(H) are diagrams showing the input keys of the digital camera according to the embodiment of the present invention and a screen displayed on the LCD in a playback mode.

When the mode-switching dial 102 has been moved to the position corresponding to "Play", the playback mode is started. Thus, a photographed image in accordance with image data stored in the memory card 16 is displayed on the LCD 21. Moreover, a menu screen as shown in FIG. 6(F) is displayed to overlap the photographed image. Display/non-display of the menu screen can be changed by depressing the input key 107.

When the input key 103 has been depressed in a state where the screen shown in FIG. 6(F) is displayed, the "manual playback mode" is changed to a "slide playback mode" shown in FIG. 6(G). When the input key 103 has been depressed in a state where the screen shown in FIG. 6(G) is displayed, the "slide playback mode" is changed to an "enlargement/scroll playback mode". When the input key 103 has been depressed in a state where a screen shown in FIG. 6(H) is displayed, the "enlargement/scroll playback mode" is changed to the "manual playback mode".

In the "manual playback mode" shown in FIG. 6(F), the number of images recorded in the memory card 16 and the order of the image among the recorded images are displayed on the LCD 21 in the form of, for example, "12/32". When the input key 104 has been depressed, an immediately forward image in the memory card 16 is displayed. When the input key 105 has been depressed, a next image is displayed. When the input key 106 has been depressed, image data can be locked to prevent unintentional deletion of image data. When the input key 106 has again been depressed, locking is suspended. When the input key 108 has been depressed, the number of images which are displayed on one screen of the LCD 21 can be selected. Whenever the input key 10B is depressed, circulation of display is performed such that, for example, one image, 2×2=4 images and 3×3=9 images are circularly changed. When the input key 109 has been depressed, image data can be eliminated. When data elimination is performed, a confirmation screen is displayed so that whether or not image data is eliminated is confirmed.

In the "slide playback mode" shown in FIG. 6(G), slide playback is started when the input key 106 has been depressed. Thus, a plurality of images can successively be displayed. When the digital camera 10 is connected to a TV set or the like, a presentation can satisfactorily be performed. When the input key 104 has been depressed, time for which one image is displayed can be set. When the input key 105 has been depressed, images which are played back in the slide manner can be selected. When the input key 108 has been depressed, the playback order can be changed between a forward direction and the reverse direction. When the input key 109 has been depressed, display/non-display of photographing information, such as date and time can be changed.

In the "enlargement/scroll model" shown in FIG. 6(H), lines for sectioning the image displayed on the LCD 21 into 4×4 regions are displayed. Moreover, a selective frame enclosing the 2×2 region is displayed. When the input keys 104, 105, 108 and 109 are depressed, the region enclosed by the selective frame is shifted. When the input key 106 has been depressed, the selected region is enlarged and displayed fully in the screen of the LCD 21.

When the mode-switching dial 102 has been moved to the position of "SH1", the view finder mode which is the first photographing mode is started.

When the setting of the view finder mode is the "automatic" in the setup mode, supply of electric power to the LCD 21 is inhibited. Therefore, the display of the LCD 21 is inhibited. Usually, no electric power is supplied to the CCD 13. When the user has depressed the shutter button 101 half, the operation of the CCD 13 is started. Thus, the control portion 11 automatically sets the exposure, focal point and the white balance. The exposure is determined according to the shutter speed and the aperture. The user uses the optical finder 110 to determine the range which must be photographed. When the mode selection button 113 has been depressed to select any one of the proximate photographing modes, the enlargement photographing mode or the panorama photographing mode, it is preferable that the range which must be photographed can accurately be confirmed. Therefore, light converged onto the CCD 13 by the converging lens 12 is conveyed into an electric signal at intervals of a fraction of one second to shorter intervals. Thus, electric signal is converted into image data so as to be transferred to the VRAM 18. Thus, an object to be photographed is displayed on the LCD 21 as a kinetic image.

When the setting of the view finder mode is the "custom" in the setup mode, a screen shown in FIG. 7(I) is displayed on the LCD 21. In an initial state, the white balance is automatically set. When the input key 104 adjacent to a position at which the setting about the white balance is displayed has been depressed, the screen is changed to a screen shown in FIG. 7(J). The setting of the white balance which has been set by a custom manner is used. When the input key 104 has been depressed in a state where the foregoing screen is displayed, the screen is changed to a screen shown in FIG. 7(K). When the input key 105 adjacent to the position at which "NO" has been displayed has been depressed, the screen is returned to the screen shown in FIG. 7(J). When the input key 104 has again been depressed, the screen is changed to the screen shown in FIG. 7(I). Thus, the white balance is made to be automatic setting. When the input key 106 adjacent to a position at "YES" has been displayed is depressed in a state where the screen shown in FIG. 7(K) is displayed, a screen is realized with which the user is able to custom-set the white balance.

In the state where the screen show in FIG. 7(I) is displayed, the light emission mode of the flash is fixed to the automatic setting. Therefore, when the flash selection button 112 has been depressed, the setting is not changed. When the input key 105 adjacent to the position at which the setting about the flash has been displayed is depressed, the screen is changed to a screen shown in FIG. 8(L). Thus, the light emission mode of the flash can be changed.

In a portion adjacent to the input key 106, setting about the exposure correction is displayed. When the input key 106 has been depressed, the screen is changed to a screen shown in FIG. 8(M). When the input keys 104 and 105 have been depressed, the degree of change of the exposure from the degree automatically set by the control portion 11 can be determined. When the input key 107 has been depressed, the original screen is restored.

When the input key 108 has been depressed, whether or not the image is recorded in color or in white and black can be selected. When the input key 109 has been depressed, whether or not the photographing operation is performed with standard sensitivity or high sensitivity can be selected.

When the user has depressed the shutter button 101 of the digital camera 10 half, adequate exposure and focus for the image which is recognized by the CCD 13 are set. Therefore, the exposure and the focus are fixed in a period of time in which the shutter button 101 is depressed half.

Figure 7:
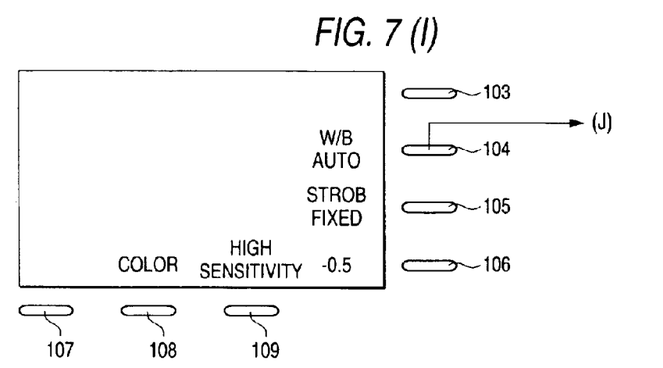
FIGS. 7(I) to 7(K) are diagrams showing the input keys of the digital camera according to the embodiment of the present invention and a screen displayed on the LCD in a view finder mode.
Figure 8:
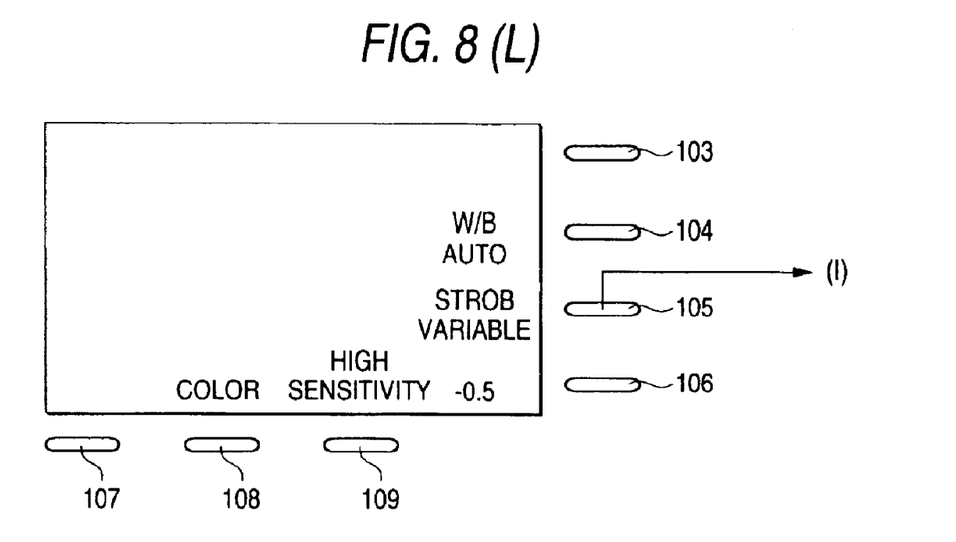
FIGS. 8(L) and 8(M) are diagrams showing the input keys of the digital camera according to the embodiment of the present invention and a screen displayed on the LCD in the view finder mode.

When any one of the proximate photographing mode, the enlargement photographing mode and the panorama photographing mode has been selected, light converged onto the CCD 13 by the converging lens 12 is conveyed into an electric signal at intervals of a fraction of one second or shorter intervals. The electric signal is converted into digital image data so as to be transferred to the VRAM 18. Thus, the object to be photographed is displayed on the LCD 21 as a kinetic image. The menu screen shown in FIGS. 7 and 8 are displayed to overlap the kinetic image.

When the user has depressed the shutter button 101 fully, the photographing operation is started so that image data is produced.

Initially, electric charges accumulated in the CCD 13 are completely discharged. Then, light converged by the converging lens 12 is input to the CCD 13. The CCD 13 converts light into an electric charge corresponding to the quantity of light. The electric signal output from the CCD 13 is converted into a digital signal by the A/D converter 14. The digital data output from the A/D converter 14 is directly transferred to the RAM 15 by a DMA (Direct Memory Access) such that the control portion 11 is bypassed to perform a quick operation and the address in the RAM 15 is instructed.

Data transferred from the CCD 13 has information about only one color of one pixel corresponding to the color of the filter. Therefore, color interpolation of data recorded in the RAM 15 is performed in accordance with color information about the surrounding pixels. For example, image data of 1280×960 pixels having color information in C, M, Y and G is produced.

To enlarge the number of images which can be recorded in the memory card 16, compression is performed by the non-reciprocal compression method conforming to JPEG (Joint Photographic Expert Group). Thus, compressed data having a small volume is produced. The JPEG method is a usual method of compressing a color image. When the compression ration is changed, the image quality of the preserved image can be adjusted. The JPEG compression operation can be performed by a software manner by the control portion 11 or a special circuit capable of raising the operation speed. Data compressed by the JPEG method is recorded on the memory card 16.

When the mode switch dial 102 has been set to "SH2", the LCD mode which is the second photographing mode is started. Thus, the object to be photographed is displayed on the LCD 21 as a kinetic image.

Figure 9:
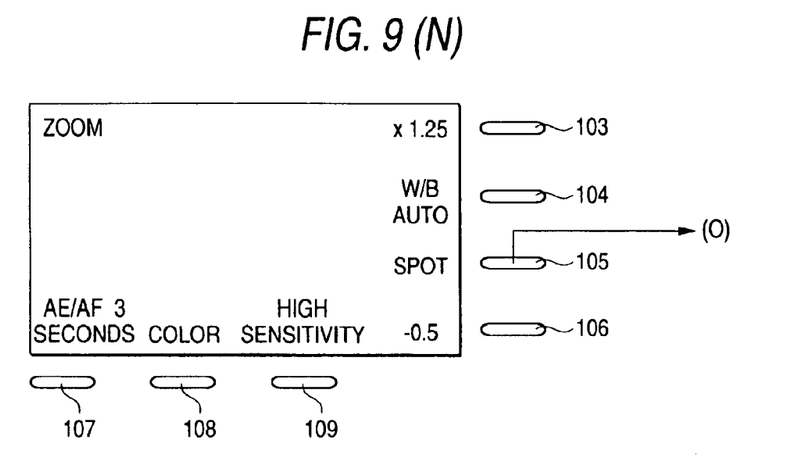
FIGS. 9(N) and 9(O) are diagrams showing the input keys of the digital camera according to the embodiment of the present invention and a screen displayed on the LCD in a LCD mode.

When "AE/AF" has been selected in the setup mode, a screen shown in FIG. 9(N) is displayed to overlap the kinetic image which is being displayed on the LCD 21.

On the screen shown in FIG. 9(N), the enlargement photographing mode has been set. Whenever the input key 103 adjacent to the position at which the magnification is displayed is depressed, the display of the magnification is circularly changed among, for example, "×1.25", "×1.6" and "×2.0". Thus, the magnification can be set. The LCD 21 displays a kinetic image in a printed range corresponding to the magnification.

When the input key 105 has been depressed in a state where the screen shown in FIG. 9(N) is displayed, a screen shown in FIG. 9(O) is displayed. The metering mode of AE/AF is changed from a spot metering mode to a center-weighted metering mode. When the input key 105 has been depressed in a state where the screen shown in FIG. 9(O) is displayed, the center-weighted metering mode is changed to the spot metering mode.

The operation which is performed when any one of the input keys 104, 106, 108 and 109 has been depressed is similar to the operation which is performed when the "custom" has been selected in the view finder mode.

Figure 10:
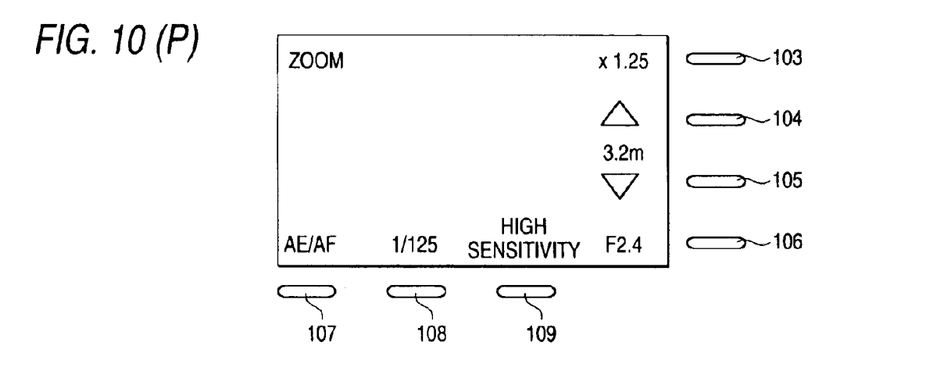
FIGS. 10(P) to 10(R) are diagrams showing the input keys of the digital camera according to the embodiment of the present invention and a screen displayed on the LCD in the LCD mode.

When "ME/MF" has been selected in the setup mode, a screen as shown in FIG. 10(P) is displayed on the kinetic image which is being displayed on the LCD 21. When the input keys 104 and 105 adjacent to the position at which the focal distance of the digital camera 10 is displayed have been depressed, the focal distance can manually be changed by the user. Therefore, photographing in a front or rear focus state is permitted.

When the input key 108 provided for a position adjacent to a position at which the shutter speed is displayed has been depressed, the shutter speed can be selected from, for example, 1/2, 1/30, 1/125 and 1/750. Moreover, shutter speed can be selected with which the aperture is given priority and which is determined by the control portion 11 such that adequate shutter speed is realized when the set aperture has been fixed as shown in FIG. 10(Q).

When the input key 106 provided for a position adjacent to a position at which the aperture is displayed has been depressed, the aperture can be selected from, for example, F2.4, F8 and F16. Moreover, the aperture can be selected with which the shutter speed is given priority and which is determined by the control portion 11 such that an adequate aperture is realized when the set shutter speed has been fixed as shown in FIG. 10(R).

When the user has completely depressed the shutter button 101, the photographing operation is started. Thus, image data is produced by a procedure similar to that in the view finder mode. Data compressed by the JPEG method is recorded on the memory card 16. A long time is sometimes taken from start of recording of image data in the memory card 16 to completion of recording. During this, an image in accordance with the image data is continuously displayed on the LCD 21.

When the mode-switching dial 102 has been moved to the position of "DP", the direct print mode is started. When the digital camera 10 has been connected to an external printer and the user has depressed the input keys 103 to 109, a photographed image can be selected and printed.

When the digital camera 10 according to the present invention is used, the following operation is permitted.

Figure 11:
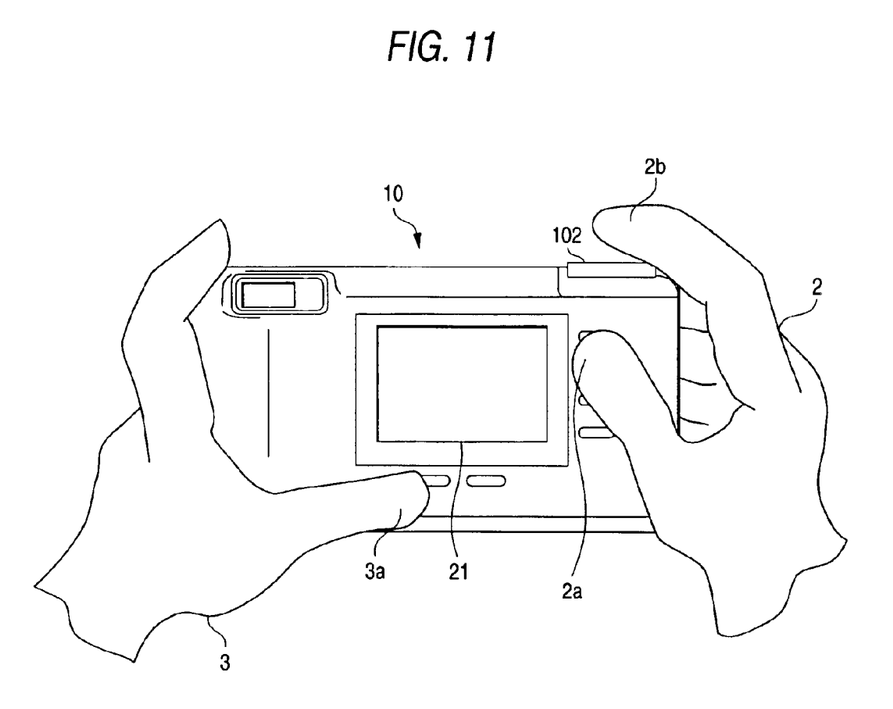
FIG. 11 is a schematic view showing a state where the digital camera according to the embodiment of the present invention is operated.

As shown in FIG. 11, the right hand 2 of the user holds either side portion of the digital camera 10. Moreover, the forefinger 2b is able to depress the shutter button. Thus, the thumb is able to operate the input keys 103, 104, 105 and 106. The residual fingers, the middle finger, the third finger and the little finger (not shown) hold the digital camera 10.

On the other hand, the left hand of the user holds the other end of the digital camera 10. The thumb 3a is able to operate the input keys 107, 108 and 109.

The input keys 103 to 109 of the digital camera 10 are distinguished into the set of the input keys 103, 104, 105 and 106 which are operated by the right hand 2 of the user and the set of the input keys 107, 108 and 109 which are operated by the left hand. Thus, intersection of the right hand 2 and the left hand 3 at a position above the LCD 21 and obstruction of movement of either hand by the other hand can be prevented. Therefore, when the operation of the digital camera 10 according to this embodiment is performed while the LCD 21 is being observed, obstruction of the display of the LCD 21 by the hand which operates the input key does not occur. Thus, the operability of the digital camera 10 can be improved.

That is, the digital camera 10 according to this embodiment requires a user to operate the input keys 103 to 109 while viewing the LCD 21. Therefore, the input keys 103 to 109 must be disposed at positions at which the input keys 103 to 109 can easily be recognized. In general, a user uses the forefinger 2b of the right hand 2 to depress the shutter button 101. Therefore, the thumb 2a is placed on the rear surface of the digital camera 10, that is, on the surface of the LCD 21. Therefore, the input keys 103, 104, 105 and 106 of the first input devices are disposed on the side portion of the LCD 21 adjacent to the shutter button 101. Thus, the operation of the foregoing input keys 103, 104, 105 and 106 can easily and smoothly be performed with the thumb 2a of the right hand 2. Moreover, the input keys 107, 108 and 109 serving as the second input devices which are operated by the left hand 3 are disposed apart from one another. Thus, if the number of the input keys is enlarged, the input keys can easily and smoothly be performed.

The input keys 103 to 109 are separated into the set of the input keys 103, 104, 105 and 106 and arranged to be operated by the right hand and the set of the input keys 107, 108 and 109 and arranged to be operated by the left hand. Thus, interference between the right hand 2 and the left hand 3 occurring when the input key is operated can be prevented. Therefore, even if a small size LCD 21 is employed, the display on the LCD 21 can easily be recognized.

The digital camera according to this embodiment enables the contents of set information displayed on the display portion to directly be changed owing to input to the input devices. Therefore, the set information items can quickly be changed. When one input key has a plurality of functions corresponding to the modes, the contents of the process which is executed can easily be recognized.

The digital camera according to this embodiment is able to change setting by depressing only one input key when setting having a small number of alternatives is changed, for example, selection of white and black photographing or color photographing is performed. Therefore, the operation can easily be performed. Moreover, each input key is disposed adjacent to each of contents of the settings displayed on the LCD. Hence it follows that the correspondence between the depressed key and caused change in the setting can easily be understood. When a large number of alternatives is large, for example, when the date and time are set, another screen is displayed to perform the setting. When the exposure is set, all of the alternatives are displayed to perform selection among the displayed alternatives. Thus, selection can easily be performed.

In the embodiment of the present invention, the optical finder is employed as the view finder. A view finder including a small-size LCD may be employed.

What is claimed is:

1. A digital camera, comprising:

an image pickup portion which converts light from an object to be photographed, into image data;

a display portion capable of displaying a plurality of set information items;

a plurality of input devices;

a circularly displaying device which circularly displays a plurality of alternatives whenever input to at least one of the input devices is performed when the number of the alternatives of the set information items is not larger than a predetermined number;

a displaying device which displays a selection screen on the display portion when input to at least one of the input devices has been performed in case where the number of the alternatives of the set information items is larger than a predetermined number;

a control portion which controls the digital camera in accordance with at least one of the set information items; and a shutter button capable of inputting an instruction to start photographing to the control portion.

2. The digital camera of claim 1, wherein the input devices include:

a plurality of first input devices disposed along a periphery of the display portion in a first direction which is in parallel with an axial line of the shutter button; and a plurality of second input devices disposed in a second direction perpendicular to the first direction.

3. The digital camera of claim 2, wherein the first input devices are disposed along a first side surface of the display portion adjacent to the shutter button, and the second input devices are disposed along a second side surface of the display portion opposite to a third side surface of the display portion adjacent to the shutter button, across the display portion.

4. The digital camera of claim 3, wherein the input devices are disposed adjacent to a plurality of set information items displayed on the display portion, respectively.

5. The digital camera of claim 4, wherein the set information items include at least one kind of set information of shutter speed, aperture, white balance, and flash.

6. The digital camera of claim 4, wherein the display portion is capable of displaying an image in accordance with the image data.

7. The digital camera of claim 4, wherein the selection screen displays all of the set information items.

* * * * *